June 9, 1936.　　　H. A. KNOX ET AL　　　2,043,251
TRANSMISSION
Filed Oct. 18, 1934　　　2 Sheets-Sheet 2
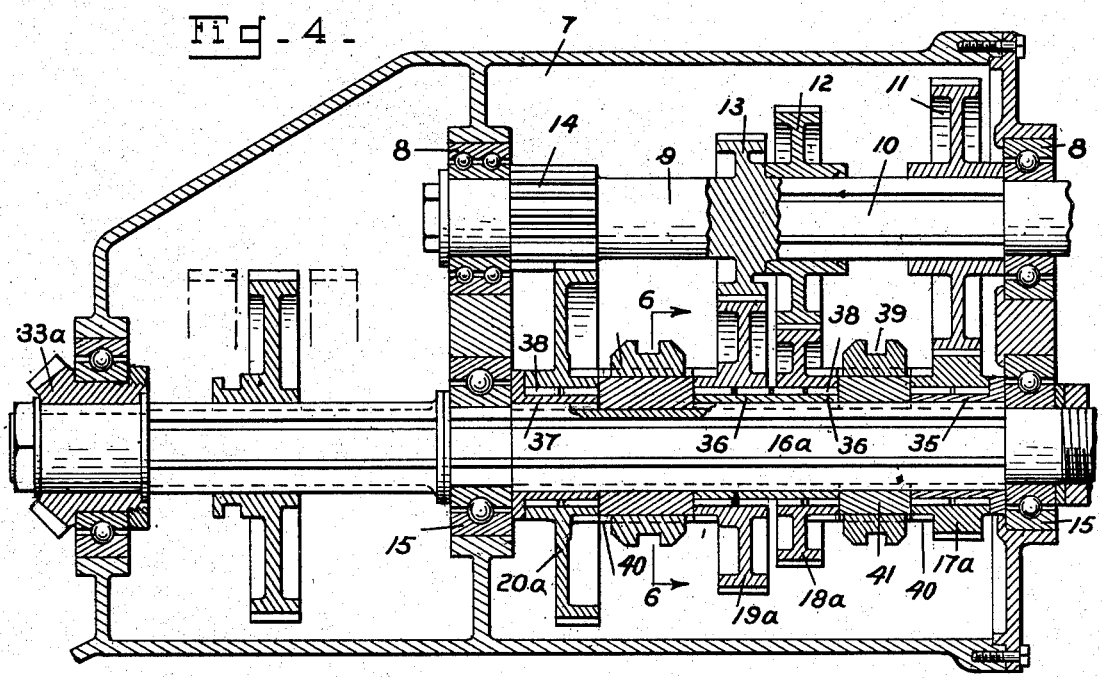
Fig.-4-
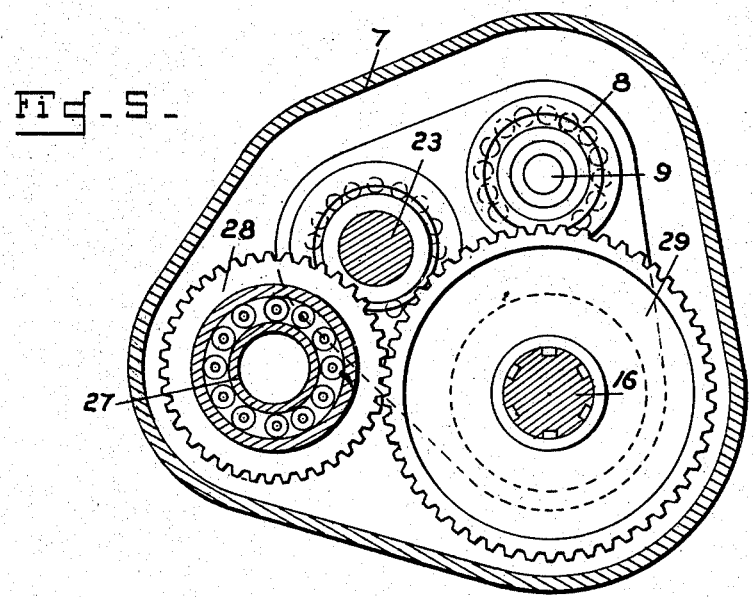
Fig.-5-
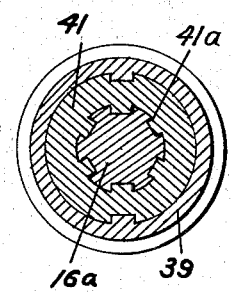
Fig.-6-
Inventors
Harry A. Knox
Thomas H. Nixon
By W. N. Roach.
Attorney Patented June 9, 1936

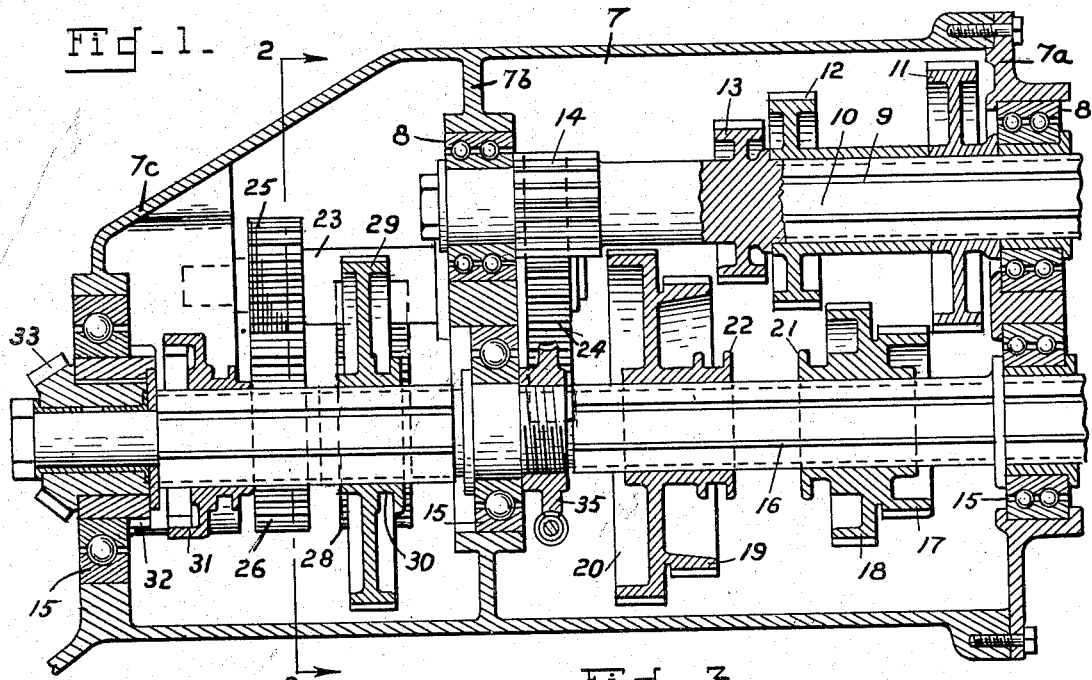
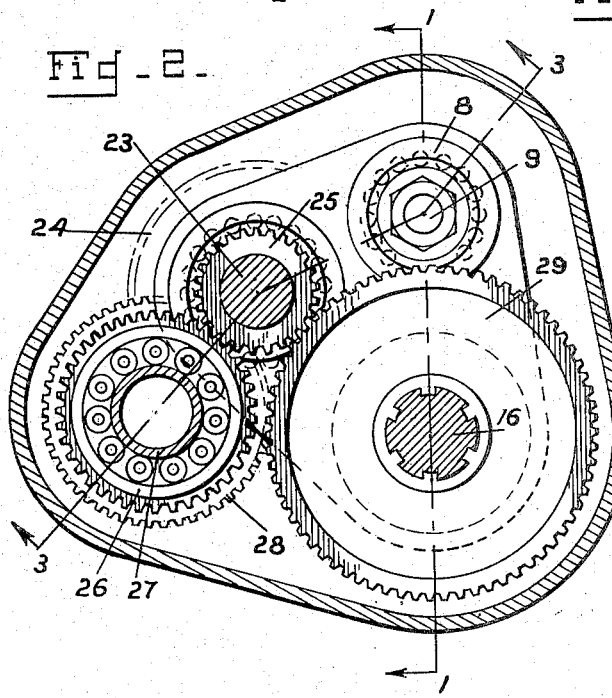
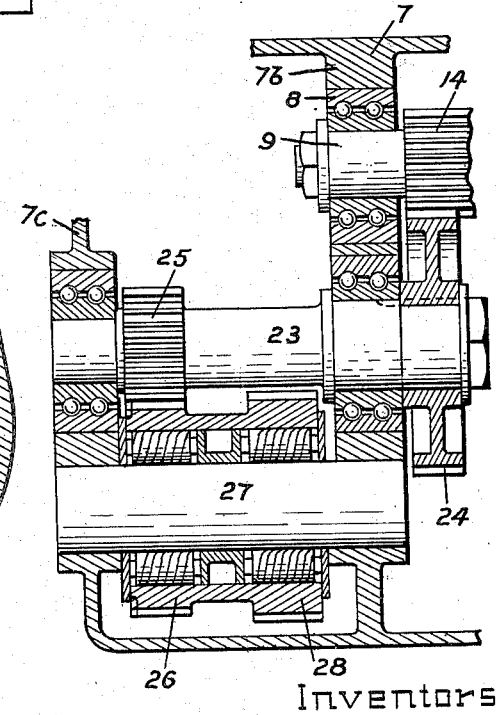

2,043,251

UNITED STATES PATENT OFFICE 2,043,251

TRANSMISSION

Harry A. Knox, Davenport, Iowa, and Thomas Hay Nixon, Gettysburg, Pa.

Application October 18, 1934, Serial No. 748,867

2 Claims. (Cl. 74—343)

(Granted under the act of March 3, 1883, as amended April 30, 1928; 370 O. G. 757)

The invention described herein may be manufactured and used by or for the Government for governmental purposes, without the payment to us of any royalty thereon.

The subject of this invention is a transmission, and it is intended more specifically as a transmission for heavy vehicles.

The main objects of the invention are the provision of a novel low speed and reverse gearings and an efficient, economical and satisfactory transmission for heavy vehicles.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a sectional view taken on the line 1—1 of Fig. 2.

Fig. 2 is a sectional view taken on the lines 2—2 of Fig. 1.

Fig. 3 is a sectional view on the line 3—3 of Fig. 2.

Fig. 4 is a longitudinal section of a modified form of the device.

Fig. 5 is a transverse section.

Fig. 6 is a section on the line 6—6 of Fig. 4.

Referring to the drawings by numerals of reference:

There is provided a transmission casing 7 having a first support 7ª, a second support 7ᵇ and a third support 7ᶜ. Journaled in the supports 7ª and 7ᵇ by means of the bearings 8—8 is a drive shaft 9 which may be directly connected to the engine through a clutch as is usual. Secured on the shaft 9 by the splines 10 or in other suitable manner are gears 11 and 12, and also secured on the shaft, as herein shown integral therewith, is a gear 13 and pinion 14.

Journaled in the transmission casing through bearings 15—15 in the supports 7ª, 7ᵇ and 7ᶜ is a driven shaft 16 parallel with the shaft 9. Mounted on this shaft are gears 17, 18, 19 and 20 adapted to be selectively driven by the respective gears 11, 12 and 13 and the pinion 14 to impart to the driven shaft four desired speeds. As herein shown these gears 17, 18, 19 and 20 are feathered on the shaft 16 and are thrown into and out of engagement with their respective driving elements through the shift collars 21 and 22 and the usual shift forks, not shown.

Journaled in the supports 7ᵇ and 7ᶜ of the casing is a first idler shaft 23 on which is mounted a gear 24 meshing with the pinion 14 on the drive shaft 9 and a gear 25 meshing with a gear 26 rotatable on a second idler shaft 27 journaled in the supports 7ᵇ and 7ᶜ of the casing 7 and having rotatable thereon a second gear 28 integral with or secured to the gear 26.

On the driven shaft 16 is provided means for driving said shaft either through the gear 25, when reverse drive is desired or through gear 28 when a low speed is desired. While several means may be employed to accomplish this result one simple form illustrated herein consists in feathering a gear 29 on the shaft 16 in position to be selectively engaged with the gear 25 or the gear 28. The gear 29 is provided with the usual shift collar 30 adapted to be engaged by a shift fork, not shown.

If desired a clutch element 31 may be slidably mounted on the driven shaft 16 to engage the element 32 and so drive the bevel gear 33, and through it the control differential, not shown.

A speedometer drive 34 may be provided on the driven shaft as shown.

In the modified form illustrated in Figs. 4, 5 and 6, the construction is the same as that heretofore described with the exception that the gears are in constant mesh and clutches are used to selectively lock the gears to the driven shaft. In this case we have the transmission casing 7, the bearing 8—8 for the drive shaft 9 on which shaft are fast by splines 10 the gears 11 and 12, and the shaft also has fast thereon the gear 13 and pinion 14.

Journaled in the transmission casing through bearing 15—15 is a driven shaft 16ª parallel with the shaft 9. Loose on this shaft are gears 17ª, 18ª, 19ª and 20ª in constant mesh with the respective gears 11, 12, and 13 and with the pinion 14. While these gears may be mounted loose on the shaft in any preferred manner, as herein shown, bushings 35, 36 and 37 are placed on the shaft and between these bushings and the respective gears, needle bearings 38 are interposed. Clutch elements 39—39 are provided for engagement with the clutch elements 40 on the gears. These elements 39 are feathered on collars 41—41 which are keyed to the shaft 16ª, as seen most clearly at 41ª Fig. 6.

The idler shafts 23 and 27 are the same as heretofore described and are provided with the same gears acting in the manner set forth in relation to Figs. 1, 2 and 3. The shaft 16ᵃ is provided with the gear 29 which may selectively engage gears 25 or 26 on the idler shafts.

In this instance the clutch 31 is omitted and the bevel gear 33ᵃ is fast on the shaft 16ᵃ.

While in one form of the device there has been shown and described shiftable gears and in the other form constant mesh gears with shiftable clutches, it is to be understood that any combination of the two falls within the spirit of this invention. For instance, the two high speed gears may be constant mesh gears with a shiftable clutch to selectively engage one or the other while the lower speeds may be provided with shiftable gears.

The operation of the device is as follows:

The clutch 31 being engaged, shifting the gear 29 to engage gear 25 will give reverse movement while engaging gear 29 with gear 26 will produce a low speed forward; shifting gear 29 into engagement with the pinion 14 will produce a low speed forward, while shifting gear 19 into engagement with gear 13 will produce an intermediate speed forward; shifting gear 18 into engagement with gear 12 will give a higher intermediate speed forward, while engaging 17 with gear 11 will give high speed forward.

The same operations are performed and the same results obtained with the modified form, with the exception that the clutch 31 is absent.

We claim:

1. In a transmission, a first, second and third support, a drive shaft mounted in the first and second supports, a driven shaft mounted in all of the supports, change-speed gearing connecting the shafts and including low-speed gearing positioned adjacent the second support, first and second idler shafts mounted in the second and third supports, a gear on the first idler shaft meshing with the low speed gearing of the drive shaft, constantly meshed gears on the idler shafts, a second gear on the second idler shaft and fast to the meshed gear on said shaft, and a gear slidable on the driven shaft between the second and third supports and selectively engageable with the constantly meshed gear of the first idler shaft and the second gear on the second idler shaft.

2. A transmission embodying a drive shaft, a driven shaft, change-speed gearing connecting the shafts, a first idler shaft driven by the drive shaft, a second idler shaft, meshed gears on the first and second idler shafts, a second gear on the second idler shaft and fast to the meshed gear on said shaft, and a gear on the driven shaft movable to selectively engage the meshed gear of the first idler shaft and the second gear on the second idler shaft.

HARRY A. KNOX.
THOMAS HAY NIXON.